Feb. 16, 1960      W. D. PRATT      2,925,273
BASEBALL TRAINING AID
Filed April 25, 1958
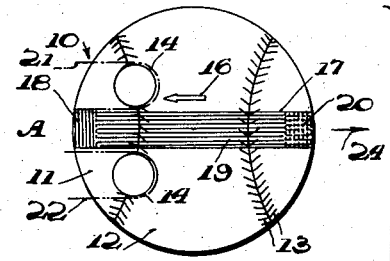
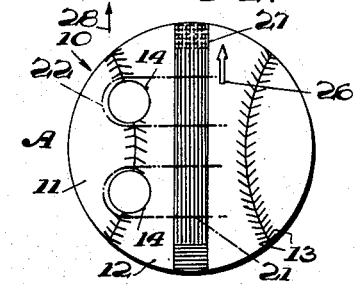
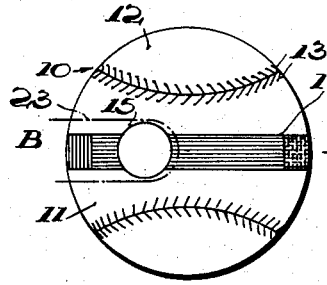
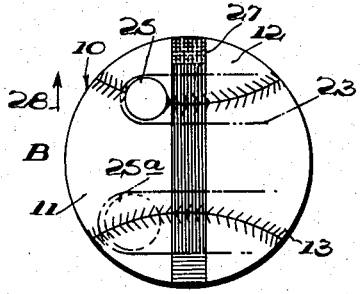
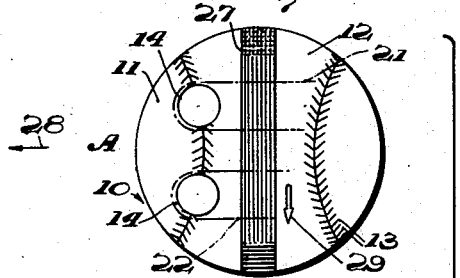
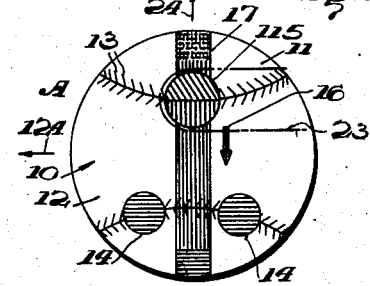
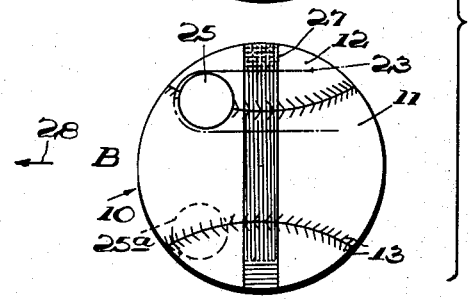
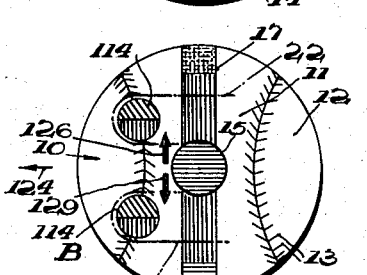
INVENTOR
*William D. Pratt*
BY
ATTORNEY

United States Patent Office 2,925,273
Patented Feb. 16, 1960

2,925,273
BASEBALL TRAINING AID

William D. Pratt, Forest Park, Ga., assignor to the United States of America as represented by the Secretary of the Army Application April 25, 1958, Serial No. 731,063

1 Claim. (Cl. 273—26)

(Granted under Title 35, U.S. Code (1952), sec. 266)

The invention described herein, if patented, may be manufactured and used by or for the Government for governmental purposes, without the payment to me of any royalty thereon.

The invention relates to training aids for baseball players and more particularly to aids for training baseball pitchers, particularly those who are endeavoring to learn the rudiments of the art.

With the foregoing in view, it is an object of the invention to provide a training aid which will show the student not only how to grip the baseball for each of a plurality of different pitches but will also show him how to release the baseball to achieve the desired effect.

A further object is to provide in such a training aid, optical means for demonstrating the degree of achievement or skill which is achieved by each pitch.

Other objects and advantages reside in the particular structure and arrangement of parts of the training aid, combinations and subcombinations of the several elements thereof, all of which will be readily apparent to those skilled in the art upon reference to the attached drawing which illustrates preferred embodiments of the invention and to the following specification wherein the invention is described and claimed.

In the drawing:

Figures 1A and 1B are respectively top and bottom views of a training aid for throwing a fast ball;

Figures 2A and 2B are like views of a similar training aid for throwing a curve;

Figures 3A and 3B are like views but show a training aid for throwing a screw ball; and Figures 4A and 4B are like views of a training aid capable of throwing all three of the pitches mentioned above.

Referring specifically to the drawing, wherein like reference characters designate like parts in all views, and referring at first to all views, 10 designates a conventional baseball which includes a cover formed of two identical cover sections 11 and 12 which are connected together by the stitches 13 of the usual endless seam. As so far described the structure is conventional and forms no part of the invention apart from the combinations and/or sub-combinations involved.

Referring now to Figures 1A and 1B, spaced gripping indicia such as the circles 14, 14 have been applied to the upper surface of the baseball 10 so as to be bisected by one portion of the seam. Likewise, the upper surface of the baseball bears directional indicia of any suitable form, as the arrow 16, to designate the direction in which the ball is to be rotated when it is thrown. The undersurface of the baseball bears a single gripping indicia such as the circle 15 which is wholly on the cover section 11 intermediate the adjacent seam portions. Finally, an equatorial band 17 has been applied to the cover in parallel relation to the directional indicia 16. The band 17 is divided into a plurality of segments of equal size. In the form illustrated, these comprise three segments 18, 19 and 20 each of which is colored with a complementary color so that when the baseball 10 is rotating on the axis of the band 17, such colors will appear to blend into a single color. In the species illustrated, the segment 18 is colored red, the segment 19 is colored blue and the segment 20 is colored yellow. As these are the primary colors of white light, the band 17 will appear white when the baseball 10 is rapidly rotated on the axis of the band. Obviously, other arrangements of segments and colors will suggest themselves and are considered as being within the scope of the invention as hereinafter claimed. For instance, alternate yellow and blue segments will appear to produce a green band and so on.

As aforesaid, Figures 1A and 1B are for training in the throwing of one form of a right handed fast ball. Thus, tips of the forefinger 21 and second finger 22 are placed on the upper gripping indicia 14 so as to extend across the stitches 13 so as to provide a maximum friction in the grip of these two fingers. The tip of the thumb 23 is placed on the lower gripping indicia 15 which has been deliberately located on a smooth portion of the cover away from the stitches to provide a minimum of friction for the grip of the thumb. The baseball 10 is now thrown so that it is rotated in the direction of the arrow 16. This is accomplished by the usual forearm motion, either underhand, side arm or over arm so long as the motion is parallel to the band 17. The baseball 10 will then be automatically rolled off of the tips of the fingers 21 and 22 with a minimum of resistance from the thumb 23 and backspin is imparted to the ball in the direction of the arrow 16 although the ball will travel in the direction of the arrow 24. If properly thrown the ball will rotate on the axis of the band 17 and the same will appear as a white band. However, if improperly thrown, the baseball will rotate on an axis which is at an angle to the band 17 and the colored segments 18, 19 and 20 will be individually visible as the ball rotates. Thus, the player himself and his instructor are immediately apprised of the correctness or incorrectness of the pitch. Likewise, the student, after receiving instruction, may practice without an instructor, until the pitch in question is mastered.

Referring now to Figures 2A and 2B, the ball 10 is marked for throwing an overhand right hand curve. Thus, although the gripping indicia 14 for the finger tips are again disposed across the stitches 13, the gripping indicia 25 for the thumb is likewise across the stitches 13 on the opposite side of the ball. It should be noted also that the fingers 21, 22 so grip the ball that they extend across two sections of the stitches of the seam and that the thumb so grips the ball that it extends along the seam. This is to provide for the maximum friction and tighter grip which is needed to impart to the ball the maximum spin which is required if the curve is to break as desired. In this arrangement, the band 27 is disposed at right angles to the band 17 of Figure 1. However, as before, the directional indicia 26 is disposed parallel to the band 27. In operation, this form of the invention is the same as in Figure 1 in that the ball is thrown with the conventional wrist snap for a curve and rolls off of the side of the forefinger 21 whereby it is caused to rotate in the direction of the indicia 26 while being thrown in the direction of the arrow 28. Again, if the ball is properly thrown, the colored segments of the band 27 will appear to blend into a single color. It is understood, of course, that for a left handed pitcher, the finger tip indicia 14 will remain the same but that the thumb indicia 25a will be oppositely disposed as indicated in broken lines, Figure 2B.

Figures 3A and 3B show a species very similar to that of Figures 2A and 2B. However, here, instead of being marked for a normal curve, the ball 10 is marked for throwing a reverse curve or screwball. Thus, the finger tip gripping indicia 14 and the thumb gripping indicia 25 or 25a as well as the band 27 are the same and the ball is gripped in the same manner and thrown in the direction indicated by the arrow 28. The difference is that the directional indicia 29 points oppositely from the corresponding indicia 26 in Figure 2A. Thus, the ball rotates oppositely from a normal curve and is thrown with a reverse snap of the wrist so that the ball rolls off of the side of the second finger 22. The break of the curve thus thrown is in the opposite direction from the normal curve. Here again, if properly thrown, the segments of the band 27 will appear to blend into a single color.

Figures 4A and 4B illustrate a further modification wherein a ball 10 is provided with indicia to permit the pupil to be instructed in the throwing of a plurality of different pitches, for example, all three of the pitches disclosed previously hereinabove. Thus, fingertip gripping indicia 14 and thumb gripping indicia 15 together with the band 17 and directional indicia 16 are the same as in Figures 1A and 1B and are for throwing a fast ball in the direction of the arrow 24. However, there has been added to Figure 4A a second thumb gripping indicia 115 and to Figure 4B two additional fingertip gripping indicia 114 together with additional and oppositely directed directional indicia 126 and 129. Also, when using these last named gripping indicia to grip the ball 10 the same is thrown in the direction of the arrow 124 which is at right angles to the arrow 24. This is necessary if but a single band 17 is to be used because the directions of rotation of the ball 10 for the curve ball and screw ball are at right angles to that for the fast ball. To avoid confusion, it is desirable to color the indicia 14 and 15 one color and that those 114 and 115 be bi-color with two contrasting colors. In like manner the directional indicia 16 may be colored to correspond to indicia 14 and 15 while the directional indicia 126 may be colored to correspond to one color of the gripping indicia 114 and 115. The remaining directional indicia 129 may be colored like the other contrasting color of the indicia 114 and 115.

It is to be understood that the markings illustrated hereinabove are but examples of many which will suggest themselves to those skilled in the art and that the pitches described are merely exemplary of many standard pitches. For instance, appropriate markings may be applied to demonstrate the throwing of a slider, a sinker, a roundhouse, change of pace curve, and many other well known pitches. Likewise, although the gripping indicia have been located at specific points, it is understood that these locations may be varied to suit hands of varying size or for other reasons.

It should be understood also, that although the drawing illustrates the rotation of the ball either on an axis corresponding to the line of flight or on a horizontal axis which is at right angles to the line of flight, these are merely illustrative of many other axes of rotation. In fact, those actually illustrated are optimum axes which would seldom be actually achieved in actual practice. In actual practice, unless the fast ball or curve is thrown directly overhand, the axis of rotation will vary from nearly horizontal to vertical as in the case of a side arm fast ball or curve. Likewise, the axis of rotation of the screw ball will vary depending upon whether the pitch is thrown overhand, sidearm or somewhere inbetween these extremes. Underhand pitches will likewise vary the axis of rotation in all pitches.

Therefore, although several species or variants of the invention have been shown and described, it should be understood that the invention is susceptible of other forms and expressions. Consequently, the invention is not considered to be limited to the precise structures shown and described hereinabove but only as hereinafter claimed.

I claim:

A training aid for baseball pitchers comprising a baseball including a cover, said cover being provided with gripping indicia designating the position of the pitcher's fingers for throwing at least one type of pitch, said cover being provided with directional indicia designating the proper direction of rotation of the baseball for said pitch, an equatorial band encircling said baseball, said band being of equal width throughout its length said band being divided into a plurality of segments of equal size, said directional indicia designating a direction parallel to said band, and said segments being alternately colored with complementary colors whereby when said pitch is properly thrown said baseball is rotating on the axis of said band so as to make the latter appear to be monochromatic.

References Cited in the file of this patent

UNITED STATES PATENTS

| | | |
|---|---|---|
| 280,807 | Farley | July 10, 1883 |
| 984,044 | Spencer | Feb. 14, 1911 |
| 984,463 | Beltran | Feb. 14, 1911 |
| 1,118,727 | Bibeanlt | Nov. 24, 1914 |
| 1,628,412 | Lesavoy | May 10, 1927 |
| 1,798,701 | Reed | Mar. 31, 1931 |
| 2,263,052 | Ross | Nov. 18, 1941 |
| 2,325,109 | Christy | July 27, 1943 |
| 2,448,731 | Park | Sept. 7, 1948 |
| 2,504,650 | Chessrown | Apr. 18, 1950 |
| 2,709,595 | DeVries | May 31, 1955 |
| 2,742,733 | Giese et al. | Apr. 24, 1956 |
| 2,779,129 | Reyher | Jan. 29, 1957 |

UNITED STATES PATENT OFFICE

CERTIFICATE OF CORRECTION

Patent No. 2,925,273                  February 16, 1960

William D. Pratt

It is hereby certified that error appears in the above numbered patent requiring correction and that the said Letters Patent should read as corrected below.

In the grant, lines 1, 2, and 3, for "William D. Pratt, of Forest Park, Georgia, assignor to the United States of America as represented by the Secretary of the Army," read -- William D. Pratt, of Forest Park, Georgia, --; lines 12 and 13, for "United States of America as represented by the Secretary of the Army" read -- William D. Pratt, his heirs or assigns --; in the heading to the printed specification, lines 3, 4, and 5, for "William D. Pratt, Forest Park, Ga., assignor to the United States of America as represented by the Secretary of the Army" read -- William D. Pratt, Forest Park, Ga. --; in the printed specification, column 4, line 29, for "length said" read -- length, said --; same column 4, list of References Cited, under UNITED STATES PATENTS, fourth item, name of inventor, for "Bibeanlt" read -- Bibeault --.

Signed and sealed this 19th day of July 1960.

(SEAL)
Attest:

KARL H. AXLINE                            ROBERT C. WATSON
Attesting Officer                     Commissioner of Patents